March 8, 1966 V. J. JANDASEK 3,238,814
HYDROKINETIC TORQUE CONVERTER MECHANISM WITH GEARED STATOR
Filed Jan. 21, 1963 2 Sheets-Sheet 2
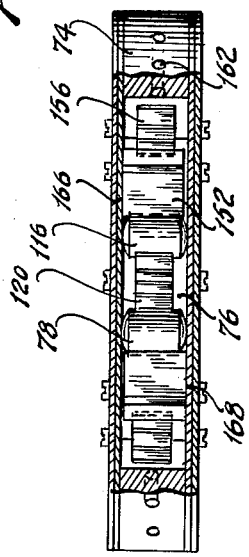
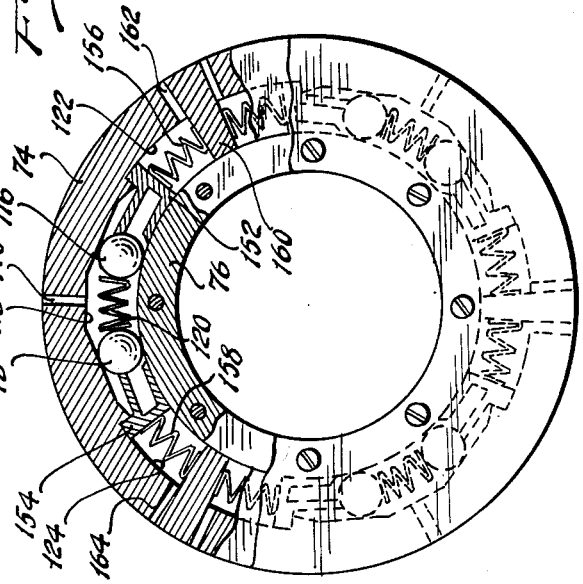
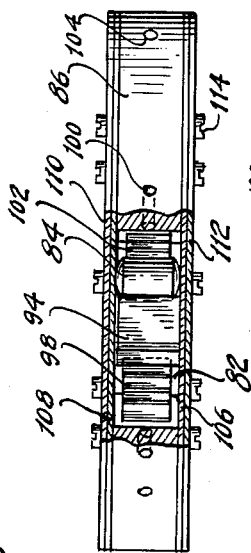
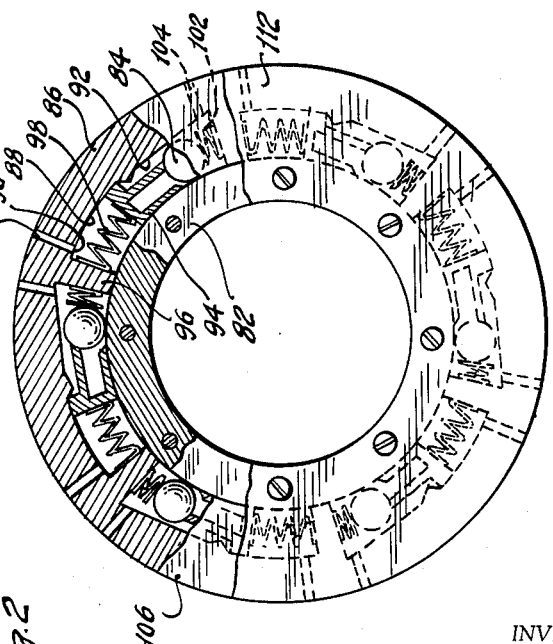
INVENTOR:
VLADIMIR J. JANDASEK
BY
ATTORNEYS.

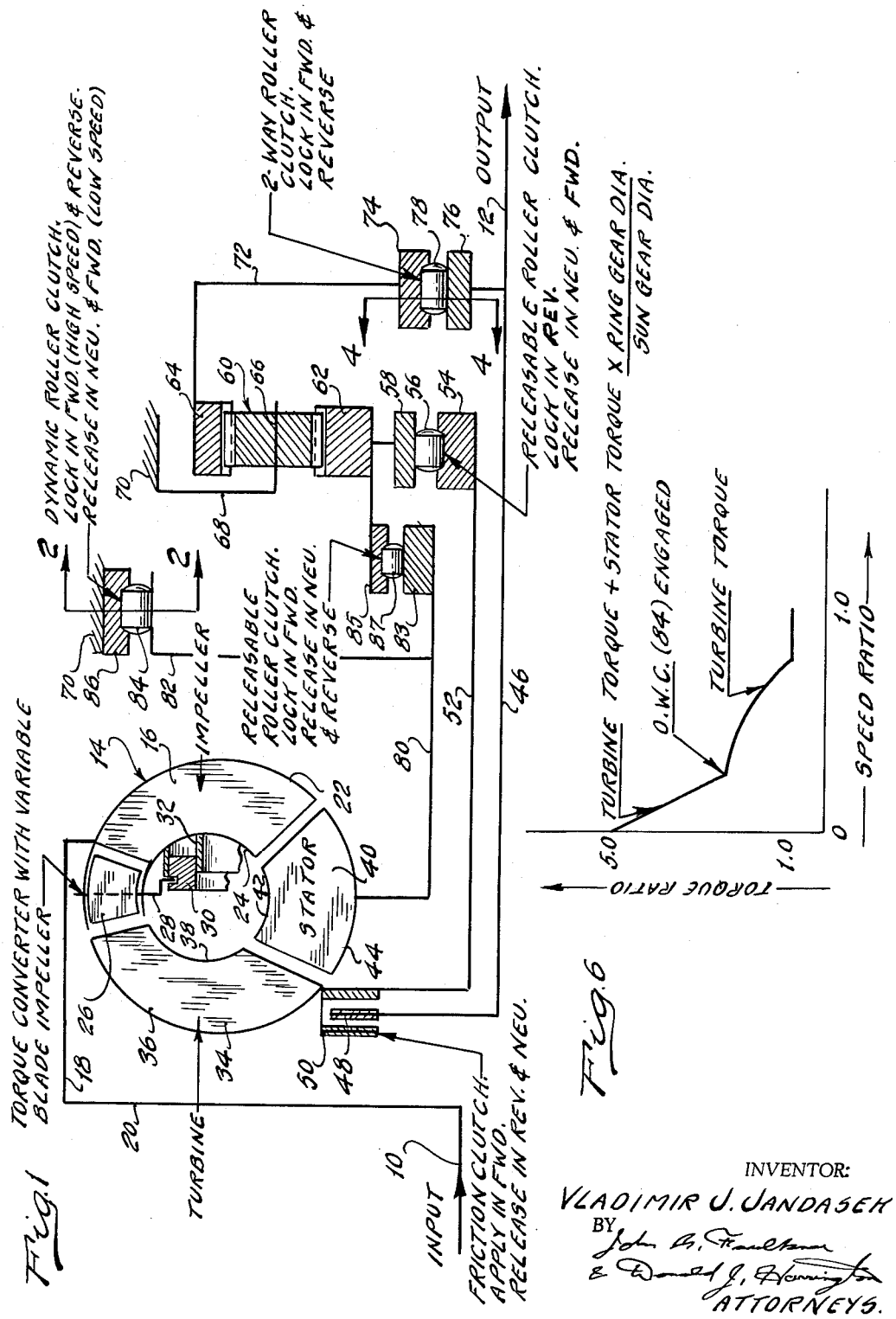

United States Patent Office 3,238,814
Patented Mar. 8, 1966

3,238,814
HYDROKINETIC TORQUE CONVERTER
MECHANISM WITH GEARED STATOR
Vladimir J. Jandasek, Dearborn, Mich., assignor to Ford
Motor Company, Dearborn, Mich., a corporation of
Delaware
Filed Jan. 21, 1963, Ser. No. 252,900
7 Claims. (Cl. 74—677)

My invention relates generally to hydrokinetic torque converter power transmission mechanisms, and more particularly to a torque converter transmission mechanism that includes a gear unit having gear elements arranged strategically with respect to the members of the converter to provide a high degree of torque multiplication throughout a major portion of the total speed ratio range.

It is a principal object of my invention to provide a power transmission mechanism having a hydrokinetic torque converter in which the negative torque developed by the stator member of the converter is utilized for the purpose of augmenting the positive torque developed by the converter turbine member.

It is another object of my invention to provide a transmission mechanism of the type above set forth wherein selectively engageable and releasable couplings are situated in separate torque delivery paths between the elements of the gear unit and the various members of the converter.

It is a further object of my invention to provide a converter transmission mechanism of the type above set forth wherein the turbine torque may be utilized to establish reverse drive operation without the need for a separate reverse gear.

It is a further object of my invention to provide a transmission mechanism of the type above set forth wherein two performance ranges are available, the stator torque augmenting the turbine torque during a first performance range and the negative torque reaction upon the stator being grounded through a selectively engageable one-way coupling during operation in a second performance range.

It is a further object of my invention to provide a geared stator torque converter transmission mechanism of the type above set forth wherein a simple gear unit is employed to the exclusion of other gear elements, and wherein the relative motion of the gear elements of the gear unit is controlled by selectively engageable and releasable clutch and brake structure.

For the purpose of describing more particularly the improvements of my invention, reference will be made to the accompanying drawings, wherein:

FIGURE 1 shows in schematic form the elements of my geared stator transmission mechanism;

FIGURE 2 is a view taken along the plane of section line 2—2 of FIGURE 1 showing a releasable roller brake assembly for the stator member of my transmission mechanism;

FIGURE 3 is a plan view, partly in section, of the structure of FIGURE 2;

FIGURE 4 is a cross sectional view taken along section line 4—4 of FIGURE 1 showing a double acting roller clutch assembly embodied in my improved mechanism;

FIGURE 5 is a plan view, partly in section, of the structure of FIGURE 4; and

FIGURE 6 is a chart showing the performance of the mechanism of FIGURE 1.

Referring first to FIGURE 1, numeral 10 designates a power input shaft that may be in the form of an engine crankshaft for an internal combustion engine for a wheeled vehicle. Numeral 12 designates a power output shaft that may be drivably connected through suitable drive line structure to the vehicle traction wheels.

The hydrokinetic torque converter is designated generally by reference character 14. It includes an impeller 16 having bladed toroidal fluid flow passages. It is drivably connected to power input shaft 10 by means of the converter impeller drive shell 18 and a drive plate 20.

The blades of the impeller 16 are situated between an outer shroud 22 and an inner shroud 24. At the exit section of impeller 16 is an auxiliary section 26. It includes adjustable blade elements that form fluid flow passages that are continuations of the flow passages defined by the blades of the impeller 16. Each blade of the section 26 can be pivoted for rotation about the axis of a supporting shaft 28 which in turn is supported by the inner and outer shrouds 24 and 22, respectively. Shafts 28 extend radially inwardly, and these extensions are offset to form cranks as indicated.

The offset portions of shafts 28 are received within an annular groove formed in an annular piston 30. This piston in turn is slidably received within an annular cylinder 32 which is carried by the inner shroud 24 of the impeller 16. Piston 30 and cylinder 32 cooperate to define a fluid pressure chamber. Passage structure may be provided for admitting fluid pressure to this pressure chamber for the purpose of shifting the piston 30 in a left-hand direction as viewed in FIGURE 1, which in turn causes an angular adjustment of the blades of impeller section 26. Thus, the effective impeller exit angle can be altered by appropriately controlling the distribution of control pressure to the annular cylinder 32.

A bladed turbine member is shown at 34. The blades of turbine member 34 are situated between an outer shroud 36 and an inner shroud 38.

A stator is shown at 40. It includes blades that are disposed within an inner shroud 42 and an outer shroud 44. Stator 40, as is apparent in FIG. 1, is disposed between the flow exit section of the turbine 34 and the flow entrance section of the impeller 16. The impeller 16, the turbine 34 and the stator 40 are situated in toroidal fluid flow relationship in the usual fashion.

A centrally disposed torque delivery shaft 46 is connected to power output shaft 12 and carries a clutch member 48 in the form of a clutch disc. Cooperating clutch discs 50 are carried by the hub of turbine 34. A suitable fluid pressure operated servo, not shown, can be used for selectively engaging and releasing the multiple disc clutch assembly defined by the discs 48 and 50. This establishes a selectively engageable connection between turbine member 34 and shaft 46.

A turbine sleeve shaft is shown at 52. It is connected drivably to turbine 34 and to an inner race 54 for a releasable roller clutch assembly. This roller clutch assembly comprises a series of rollers 56 situated between an inner race 54 and an outer race 58. One of the races, such as the race 54, may be cammed so that the rollers 56 can cooperate therewith to establish a one-way driving connection between the races during operation in reverse. During operation in forward or neutral, however, provision is made for releasing the rollers 56 so that free wheeling motion in either direction can be established. This roller clutch assembly will be described more particularly in subsequent portions of this disclosure.

A simple gear unit is shown at 60. It includes an external gear 62, a ring gear 64 and pinions 66. These pinions 66 are rotatably mounted upon the stationary carrier 68 which may be anchored permanently, as indicated, to the transmission housing, a portion of which is schematically designated by reference character 70.

Ring gear 64 is drivably connected by a suitable drive member 72 to an outer race 74 for a second roller clutch assembly. This second clutch assembly includes also an inner race 76, and rollers 78 are situated between races 74 and 76. One of the races, such as race 74, can be cammed to permit camming action with the roller 78 to inhibit relative rotation of one race with respect to the other. The rollers 78 may be adapted to be released to permit relative motion of races in either direction or applied to permit the races to be locked for joint rotation in either direction. This roller clutch assembly will be described also more particularly in subsequent portions of this disclosure.

Stator 40 is connected through a stator shaft 80 to a brake drum 82. This drum 82 can be anchored to the housing 70 by means of a releasable roller brake that includes rollers 84. These rollers are disposed between an outer race 86 and the brake drum 82. The race 86 can be cammed to permit camming action of the rollers 84 thus causing the stator to be braked against rotation in one direction, but it will permit free wheeling in the opposite direction. Provision may be made, however, for permitting free wheeling motion of the drum 82 with respect to the housing 70 in either direction. This releasable roller brake assembly also will be described more particularly in subsequent portions of this disclosure, and more particularly with reference to FIGS. 2 and 3.

The brake drum 82 is connected to an inner race 83 for another releasable roller clutch assembly. This assembly includes also an outer race 85 and rollers 87 situated between the races 83 and 85. One of the races may be cammed to permit relative free-wheeling motion in the direction of motion of turbine member 34 while inhibiting relative free-wheeling motion in the opposite direction. Like the rollers 84 for the previously described releasable roller brake assembly, rollers 87 may be shifted to a release position to permit free-wheeling motion of the races 83 and 85 with respect to each other in either direction.

Referring now to FIGS. 2 and 3, I have shown a coupling structure that may be adapted to function as a roller brake or as a roller clutch. For purposes of this description, however, the structure of FIGS. 2 and 3 will be considered to be a roller brake.

It will be apparent that the race 86, previously described with reference to FIG. 1, is formed with a plurality of recesses 88. These recesses define two separate portions, one portion being designated by reference character 90 and the other portion being designated by reference character 92. A piston 94 is situated within the recess portion 90, and it is slidably situated with respect to the inner race that is defined by brake drum 82.

Drum 82 is piloted within race 86 by pilot portions 96 situated at either circumferential side of each recess 88.

Pistons 94 are adapted to move tangentially, and they cooperate with the recess portion 90 to define pressure chambers. If desired, a spring 98 can be situated in this recess for normally biasing the pistons 94 in a clockwise direction as viewed in FIG. 2. Fluid pressure can be admitted to the recess portion 90 through suitable passage structure 100.

Recess portion 92 defines a cam surface as indicated. Rollers 84 are adapted normally to engage these cam surfaces. Camming engagement is established by springs 102 situated adjacent each roller. Springs 102 are anchored against the pilot portions 96 of the race 86. It will be apparent therefore that counterclockwise rotation of drum 82 with respect to race 86 will be inhibited, although free-wheeling motion in the opposite direction is permitted. It will be apparent also, however, that if fluid pressure is admitted through passage 100, rollers 84 will be shifted tangentially out of camming engagement with their respective cam surfaces thus permitting free-wheeling motion of drum 82 in a counter-clockwise direction.

Referring next to FIG. 3, there can be seen a phasing ring or disc which carries the piston 94 within the recess portion 92. This disc is designated by reference character 106. The pistons 94 are formed integrally with disc 106 and thus are caused to shift in unison. The force acting upon one piston thus will augment the force acting upon the other so that all of the rollers 84 can be disengaged regardless of unequal loading of the rollers.

A closure disc 108 can be situated at the opposite side of the race 86 to define in part the pressure chambers for the pistons. Cover plates 110 and 112 may be used to form an effective fluid seal. The entire assembly can be bolted together by clamping screws 114.

The mode of operation of the releasable roller clutch assembly shown in part at 87 can be explained also with reference to FIGS. 2 and 3. This roller clutch assembly can be similar in construction to the roller brake assembly shown in part at 84 except that the outer race 85 is adapted to move with respect to the housing. Thus the race 85 would correspond to race 86 and race 83 would correspond to the race defined by brake drum 82. Suitable pistons and porting of the type shown in FIGS. 1 and 2 can be provided for the clutch assembly shown in part at 87 to release the rollers 87 from a clutching position as fluid pressure is admitted behind the pistons carried by a common phasing disc. Race 85 is connected to external gear 62 as indicated.

The releasable roller clutch assembly shown in part at 56 can be similar to the roller clutch assembly shown in part at 87. Its mode of operation is similar to the mode of operation of the roller brake assembly described with reference to FIGS. 2 and 3. In this instance, however, the race 58 would correspond to race 86 and the race 54 would correspond to the race defined by brake drum 82. Rollers 56, like rollers 87, correspond to rollers 84 of FIGS. 2 and 3.

Referring next to FIGS. 4 and 5, it will be apparent that relative motion of the races 74 and 76 for the two-way roller clutch assembly is controlled by cooperating pairs of rollers, one of which is shown at 78 and the other of which is shown at 116. These rollers 78 and 116 are disposed within a recess 118 formed in race 74. The central region of recess 116 defines a pair of opposed cam surfaces, one roller cooperating with each surface. The rollers are biased normally into camming engagement with their respective cam surfaces by a spring 120.

At each circumferential end of the recess 118 there is provided a pressure chamber. These chambers are identified by reference characters 122 and 124. Situated within pressure chambers 122 and 124 are pistons 152 and 154, respectively.

Pistons 152 normally are biased in a counter-clockwise direction, as viewed in FIG. 4, by springs 156. Also, pistons 154 are biased normally in a clockwise direction as viewed in FIG. 4 by springs 158. These springs are anchored against pilot portions 160 at either circumferential end of the recesses 118.

Fluid pressure can be admitted to chamber 122 through a passage 162 and fluid pressure can be admitted to chamber 124 through passage 164. An exhaust port is shown at 170 in communication with the central region of recess 118.

Pistons 152 are carried by a first phasing disc 166 situated on one axial side of the race 74. Pistons 154 are carried by a second phasing disc 168 situated at the other axial side of the race 74. Thus pistons 152 move in unison and so do the pistons 154.

If fluid pressure is admitted to chamber 124 through passage 164, free-wheeling motion of race 76 in a counter-clockwise direction with respect to race 74 can be accommodated. If this chamber is exhausted, however, such free-wheeling motion is prevented. Similarly, if pressure is admitted to chamber 122 through passage 162, free-wheeling relative motion of race 76 with respect to race 74 in a clockwise direction is permitted. This free-wheeling motion is inhibited, however, when chamber 122 is exhausted. If both chambers 122 and 124 are exhausted, free-wheeling motion of one race with respect to the other is inhibited in each direction.

During forward drive operation of the transmission mechanism, the multiple disc clutch assembly shown at 48 and 50 is applied. Thus turbine torque is delivered directly to shaft 46 and then to power output shaft 12. Turbine torque is developed as the engine drives impeller member 16 and establishes toroidal fluid circulation. A negative torque reaction upon the stator member 40 during the initial torque conversion range is transmitted through the roller clutch assembly shown in part at 87 to the external gear 62. Under these conditions, the roller brake assembly shown in part at 84 and the roller clutch assembly shown in part at 56 are released in the manner previously described. Thus stator torque is multiplied by the gear unit 60 and the direction of this torque is reversed by reason of the fact that the carrier 68 is anchored. The resulting ring gear torque then is distributed through the roller clutch assembly shown in part at 78 to the power output shaft 12. This latter roller clutch assembly is conditioned for delivering positive driving torque under these circumstances by exhausting pressure chambers 124.

Thus the turbine torque is augmented by the stator torque. This condition continues throughout the initial speed ratio range which results in an unusually high stall torque ratio. As the speed ratio increases, the torque ratio of course decreases. Reference may be made to FIG. 6 for an understanding of the speed ratio-torque ratio relationship. When a predetermined speed ratio is achieved, the stator torque augmentation decreases. Thus it is desirable at this point to apply the releasable brake shown in part at 84. This can be accomplished by exhausting the pressure chamber for the roller brake assembly. The stator therefore becomes anchored to the housing and this results in an increase in the effective torque ratio for the converter at any given speed ratio. The roller clutch assembly 78 free-wheels at this time, the pressure chambers 122 being exhausted. A relatively high degree of torque ratio carryout thus can be accomplished as evidenced by the intermediate part of the curve of FIG. 6.

When the torque converter coupling point is reached, the negative stator torque is diminished to approximately zero. Upon subsequent increases in speed ratio, the stator then will free-wheel in the same direction as the direction of rotation of the turbine. The overrunning brake assembly shown in part at 84 will permit this to occur. Also, the overrunning clutch assembly shown in part at 87 will permit free-wheeling motion of the stator with respect to external gear 62 since the stator no longer delivers torque in a reverse direction. When the coupling range for the converter has been achieved during cruising operation, the gearing therefore has no function and the converter acts as a fluid coupling connection between the shafts 10 and 12. Likewise the overrunning clutch assembly shown in part at 78 can be disabled by pressurizing the chambers behind the pistons.

During operation in forward drive, the releasable roller clutch assembly as shown in part at 56 is pressurized thus disabling it to permit relative rotation of the races 54 and 58 in either direction.

To establish reverse drive operation, the overrunning brake assembly shown in part at 84 is exhausted thus permitting brake drum 82 to become anchored to the housing 70. Likewise, the multiple disc clutch assembly shown at 48 and 50 is released. Turbine torque then is delivered directly to race 54. The overrunning clutch assembly shown in part at 56 is exhaused thus conditioning this assembly to deliver turbine torque from race 54 to race 58. This drives external gear 62 in the direction of rotation of turbine 34. The overrunning clutch assembly shown in part at 87 is applied by exhausting its pressure chambers.

The external gear torque then is multiplied by the gear unit and the ring gear 64 is driven in a reverse direction. The two-way roller clutch assembly shown in part at 78, as previously mentioned, is adapted to deliver torque in either direction. Therefore the ring gear torque is delivered to the output shaft 12 in a reverse direction. The pressure chambers 124 may be exhausted, however, to prevent torque feedback if the shaft 12 were to tend to overrun race 74.

The adjustable impeller blade exit feature may be introduced to provide a still higher degree of torque ratio carryout for optimum efficiency cruising performance. The effective blade exit angle may be adjusted forwardly to establish optimum efficiency operation. That is, it may be adjusted in the direction of rotation of the pump. On the other hand, the torque ratio may be augmented if desired by adjusting the blades of the exit section of the impeller in the opposite direction. For a particular description of this adjustable impeller blade exit feature, reference may be made to the co-pending application of Martin G. Gabriel, Serial No. 167,071, filed January 18, 1962, now abandoned, which is assigned to the assignee of my instant invention.

Fluid pressure may be distributed to the fluid pressure controlled brake shown in part at 84 and the fluid pressure controlled clutches shown in part at 87, 56 and 78 through suitable internal passage structure. In the case of the clutches, the passage structure can be defined by the torque delivery shafts and rotary torque delivery structure to which the outer race of the clutch is connected. Such pressure distribution means for fluid pressure operated friction disc clutches is well known. For example, see reference Patent No. 3,083,589. The same fluid pressure distribution system can be employed in the structure of the instant disclosure. The internal passage structure that communicates with the turbine driven clutch members may form a counterpart for the passage structure shown in Patent No. 3,083,589 through which pressure is distributed to the rotary clutch drum servo.

Having thus described a preferred embodiment of my invention, what I claim and desire to secure by U.S. Letters Patent is:

1. A power transmission mechanism comprising a hydrokinetic torque converter unit having an impeller, a turbine and a stator disposed in toroidal fluid flow relationship, a gear unit having a torque input gear member, a torque output gear member and a reaction member, means for anchoring said reaction member, said members being disposed in driving relationship, releasable brake means for absorbing the negative torque reaction of said stator, means including a releasable first clutch for delivering the torque of said stator to said torque input gear member when said brake means is released, a driving member, a driven member, means including a selectively engageable clutch for connecting said turbine to said driven member, means including a second clutch adapted to connect said torque output gear member to said driven member for torque delivery in both reverse driving and forward driving directions, and means including a releasable third clutch for connecting said turbine to said torque input gear member during reverse drive, said third clutch being released during torque delivery in a forward driving direction and said first clutch being released during torque delivery in a reverse driving direction.

2. A power transmission mechanism comprising a hydrokinetic torque converter unit having an impeller, a turbine and a stator disposed in toroidal fluid flow relationship, a gear unit having a torque input gear member, a torque output gear member and a reaction member, means for anchoring said reaction member, said members being disposed in driving relationship, releasable brake means for absorbing the negative torque reaction of said stator, means including a releasable clutch for delivering the torque of said stator to said torque input gear member when said brake means is released, a driving member, a driven member, means including a selectively engageable clutch for connecting said turbine to said driven member, means including a second selectively engageable clutch for connecting said torque output gear member to said driven member, means including a third clutch for connecting said turbine to said torque input gear member, said brake means comprising an overrunning brake assembly capable of inhibiting rotation of said stator in one direction under the influence of reverse stator torque and means for disabling said brake means during operation of said mechanism in a high performance range.

3. A power transmission mechanism comprising a hydrokinetic torque converter unit having an impeller, a turbine and a stator disposed in toroidal fluid flow relationship, a gear unit having a reaction element, a torque input element and a torque output element, said elements being disposed in driving relationship, a driving member, a driven member, releasable brake means for anchoring said stator during operation of said mechanism in a high efficiency operating range, first coupling means for connecting said stator to said torque input element, means for selectively disabling said first coupling means, said driving member being connected to said impeller, second coupling means for establishing a releasable two-way driving connection between said torque ouput element and said driven member, means for disabling said second coupling means, third coupling means defining in part a driving connection between said turbine and said torque input element, means for selectively disabling said third coupling means, and a selectively engageable clutch defining in part a driving connection between said turbine and said driven member during forward drive operation.

4. A power transmission mechanism comprising a hydrokinetic torque converter unit having an impeller, a turbine and a stator disposed in toroidal fluid flow relationship, a gear unit having a reaction element, a torque input element and a torque output element, said elements being disposed in driving relationship, a driving member, a driven member, releasable brake means for anchoring said stator during operation of said mechanism in a high efficiency operating range, first coupling means for connecting said stator to said torque input element, means for selectively disabling said first coupling means, said driving member being connected to said impeller, means for establishing a two-way driving connection between said torque output element and said driven member, second coupling means defining in part a driving connection between said turbine and said torque input element, means for selectively disabling said second coupling means, a selectively engageable clutch defining in part a driving connection between said turbine and said driven member, and means for disabling selectively said brake means during operation in a high torque ratio operating range.

5. A power transmission mechanism comprising a hydrokinetic torque converter unit having an impeller, a turbine and a stator disposed in toroidal fluid flow relationship, a gear unit having an external gear member, a ring gear member, a carrier member and pinions journaled upon said carrier in meshing engagement with said external and ring gear members, means for anchoring said carrier, an overrunning brake means for inhibiting rotation of said stator in one direction while accommodating free-wheeling motion thereof in the opposite direction, means for disabling selectively said overrunning brake means, a driving member, a driven member, said impeller being connected to said driving member, means for establishing a two-way driving connection between said ring gear and said driven member, means including a selectively engageable clutch for establishing a driving connection between said driven member and said turbine, an overrunning coupling connection between said turbine and said external gear member for accommodating the delivery of driving torque from said turbine to said external gear member in one direction while accommodating free-wheeling motion of said external gear with respect to said turbine in the opposite direction, coupling means for establishing a one-way driving connection between said external gear member and said stator whereby reverse driving torque of said stator can be delivered to said external gear member when said brake means is disabled, and means for disabling selectively said coupling means during operation in reverse, said brake means being adapted to anchor said stator during operation of said mechanism in a high efficiency forward drive operating range, said brake means being disabled during operation of said mechanism in a high torque ratio forward drive performance range.

6. A power transmission mechanism comprising a hydrokinetic torque converter unit having an impeller, a turbine and a stator disposed in toroidal fluid flow relationship, a gear unit having an external gear member, a ring gear member, a carrier member and pinions journaled upon said carrier in meshing engagement with said external and ring gear members, means for anchoring said carrier, releasable overrunning brake means for inhibiting rotation of said stator in one direction while accommodating free-wheeling motion thereof in the opposite direction, means for releasing selectively said overrunning brake means, a driving member, a driven member, said impeller being connected to said driving member, means for establishing a two-way driving connection between said ring gear and said driven member, means including a selectively engageable clutch for establishing a driving connection between said driven member and said turbine, an overrunning coupling connection between said turbine and said external gear member for accommodating the delivery of driving torque from said turbine to said external gear member in a one direction while accommodating free-wheeling motion of said external gear with respect to said turbine in the opposite direction, means for selectively disabling said two-way connection, coupling means for establishing a one-way driving connection between said external and said stator whereby reverse driving torque of said stator can be delivered to said external gear member when said brake means is disabled, means for disabling selectively said coupling means, said brake means being adapted to anchor said stator during operation of said mechanism in a high efficiency operating range, said brake means being disabled during operation of said mechanism in a high torque ratio performance range, and means for selectively disabling said one-way driving connection.

7. A power transmission mechanism comprising a hydrokinetic torque converter unit having an impeller, a turbine and a stator disposed in toroidal fluid flow relationship, a gear unit having an external gear member, a ring gear member, a carrier member and pinions journaled upon said carrier in meshing engagement with said external and ring gear members, means for anchoring said carrier, releasable overrunning brake means for inhibiting rotation of said stator in one direction while accommodating free-wheeling motion thereof in the opposite direction, means for releasing selectively said overruuning brake means, a driving member, a driven member, said impeller being connected to said driving member, means including a selectively engageable clutch for establishing a driving connection between said driven member and said turbine, a releasable overrunning coupling connection between said turbine and said external gear member for accommodating the delivery of driving torque from said turbine to said external gear member in a one direction while accommodating free-wheeling motion of said external gear with respect to said turbine in the opposite direction, means for selectively releasing said overrunning coupling connection means for establishing a releasable one-way driving connection between said external gear member and said stator whereby reverse driving torque of said stator can be delivered to said external gear member when said brake means is released, means for releasing selectively said one-way connection, said brake means being adapted to anchor said stator during operation of said mechanism in a high efficiency operating range, said brake means being disabled during operation of said mechanism in a high torque ratio performance range, releasable coupling means for establishing a one-way driving connection between said ring gear and said power output member in a forward driving direction while accommodating relative free-wheeling motion of said ring gear member in the reverse driving direction, means for establishing a one-way driving connection between said ring gear member and said driven member in a reverse driving direction while accommodating free-wheeling relative motion of said driven member in the forward driving direction, and means for selectively interrupting each driving connection between said ring gear member and said driven member.

References Cited by the Examiner

UNITED STATES PATENTS

| | | | |
|---|---|---|---|
| 2,786,365 | 3/1957 | Lammerz | 74—677 |
| 2,850,918 | 9/1958 | Pollard | 74—677 |
| 2,905,025 | 9/1959 | Karlsson et al. | 74—677 |
| 3,073,181 | 1/1963 | Kronogard | 74—677 |
| 3,083,589 | 4/1963 | Knowles et al. | 74—730 X |

DON A. WAITE, *Primary Examiner.*